(12) United States Patent
Takahashi et al.

(10) Patent No.: US 10,917,537 B2
(45) Date of Patent: Feb. 9, 2021

(54) IMAGE READING DEVICE AND IMAGE FORMING APPARATUS

(71) Applicant: FUJI XEROX CO., LTD., Tokyo (JP)

(72) Inventors: Kaoru Takahashi, Kanagawa (JP); Yoshiaki Haginoya, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/587,202

(22) Filed: Sep. 30, 2019

(65) Prior Publication Data

US 2020/0329170 A1    Oct. 15, 2020

(30) Foreign Application Priority Data

Apr. 15, 2019    (JP) .................................. 2019-076968

(51) Int. Cl.
*H04N 1/00*    (2006.01)
*H04N 1/028*    (2006.01)

(52) U.S. Cl.
CPC ....... *H04N 1/0289* (2013.01); *H04N 1/00997* (2013.01); *H04N 1/02855* (2013.01)

(58) Field of Classification Search
CPC .. G03G 15/043; G03G 15/0435; G03G 15/04; G03G 15/326; G03G 15/0131; G03G 15/0194; G03G 15/04072; G03G 15/1615; G03G 15/5058; G03G 2215/0161; H04N 1/02815; H04N 1/02835; H04N 1/031; H04N 1/1008; H04N 1/40037; H04N 1/04; H04N 1/40006; H04N 1/40056; H04N 2201/0408; H04N 2201/0422; B41J 2/473

USPC .......................................... 358/475, 509, 474
See application file for complete search history.

(56) References Cited

U.S. PATENT DOCUMENTS

| | | | |
|---|---|---|---|
| 6,750,990 B1 | 6/2004 | Ohashi | |
| 2003/0202093 A1* | 10/2003 | Kurosawa | H04N 1/04 348/95 |
| 2005/0094215 A1* | 5/2005 | Nagasaka | H04N 1/00031 358/406 |
| 2006/0193019 A1* | 8/2006 | Nakano | G03G 15/043 358/521 |
| 2008/0187250 A1* | 8/2008 | Misaka | H04N 1/4076 382/312 |
| 2009/0103149 A1* | 4/2009 | Sakakibara | H04N 1/00806 358/514 |

(Continued)

FOREIGN PATENT DOCUMENTS

| | | |
|---|---|---|
| JP | 2001-144901 A | 5/2001 |
| JP | 2006-129162 A | 5/2006 |

*Primary Examiner* — Negussie Worku
(74) *Attorney, Agent, or Firm* — Oliff PLC

(57) ABSTRACT

An image reading device includes a glass having a document reading surface along which a document moves; an image reading unit movable in a sub-scanning direction and including a light emitting portion that emits light to illuminate the document with the light and a light receiving portion that receives the light reflected by the document, the image reading unit reading the document that moves along the document reading surface at a predetermined document reading position; and a light emission control unit that causes the light emitting portion to emit the light so that the light enters the glass through a side surface that crosses the document reading surface in an operation different from an operation in which the image reading unit reads the document.

16 Claims, 11 Drawing Sheets

(56) References Cited

U.S. PATENT DOCUMENTS

| | | | |
|---|---|---|---|
| 2010/0245953 A1* | 9/2010 | Nagasaka | H04N 1/40056 |
| | | | 358/509 |
| 2014/0118798 A1* | 5/2014 | Ikeno | H04N 1/00615 |
| | | | 358/465 |
| 2014/0355080 A1* | 12/2014 | Suzuki | H04N 1/02815 |
| | | | 358/475 |
| 2017/0242382 A1* | 8/2017 | Zaima | G03G 15/01 |
| 2018/0103168 A1* | 4/2018 | Sakuma | H04N 1/0066 |
| 2018/0270385 A1* | 9/2018 | Zheng | H04N 1/00997 |
| 2018/0302526 A1* | 10/2018 | Takahashi | H04N 1/00997 |
| 2019/0281179 A1* | 9/2019 | Hosogoshi | H04N 1/00835 |
| 2020/0106892 A1* | 4/2020 | Honda | H04N 1/00063 |

* cited by examiner

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2019-076968 filed Apr. 15, 2019.

BACKGROUND

(i) Technical Field

The present disclosure relates to an image reading device and an image forming apparatus.

(ii) Related Art

An example of a known image reading device reads a document image on a document reading glass and includes illuminating means for illuminating a document on the document reading glass; a glass cleaning mode; and control means for controlling an illuminating operation of the illuminating means in the glass cleaning mode (Japanese Unexamined Patent Application Publication No. 2006-129162).

Another example of a known image reading device reads an image while moving a document along a document table glass at a constant speed, and includes black-streak-image detecting means and control means (Japanese Unexamined Patent Application Publication No. 2001-144901). The black-streak-image detecting means determines whether or not a black streak image has occurred based on an image signal obtained by an image reading operation. When the black-streak-image detecting means determines that a black streak image has occurred, the control means determines that dust or dirt is present on the document table glass and performs a control operation of changing a stop position of an optical system that guides light reflected by the document to an image reading system in the image reading operation.

SUMMARY

A document reading device includes a reading unit including a light source that emits light toward a document on a reading glass while the reading unit is at a predetermined position for reading the document. The reading unit reads the document by receiving light reflected by the document with a sensor. The light source emits a large amount of light. When, in particular, an LED light source is used, the light travels in an accurately straight direction. When a person directly views the light emitted from the light source, that person cannot easily visually recognize an object on the reading glass, and may be dazzled by the light.

Aspects of non-limiting embodiments of the present disclosure relate to an image reading device and an image forming apparatus with which an amount of light that a user visually senses is less than that in a case where a light source included in a reading unit emits light toward a back surface of a reading glass at a large angle with respect to the glass surface.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image reading device including a glass having a document reading surface along which a document moves; an image reading unit movable in a sub-scanning direction and including a light emitting portion that emits light to illuminate the document with the light and a light receiving portion that receives the light reflected by the document, the image reading unit reading the document that moves along the document reading surface at a predetermined document reading position; and a light emission control unit that causes the light emitting portion to emit the light so that the light enters the glass through a side surface that crosses the document reading surface in an operation different from an operation in which the image reading unit reads the document.

BRIEF DESCRIPTION OF THE DRAWINGS

An exemplary embodiment of the present disclosure will be described in detail based on the following figures, wherein.

DETAILED DESCRIPTION

Figure 1:
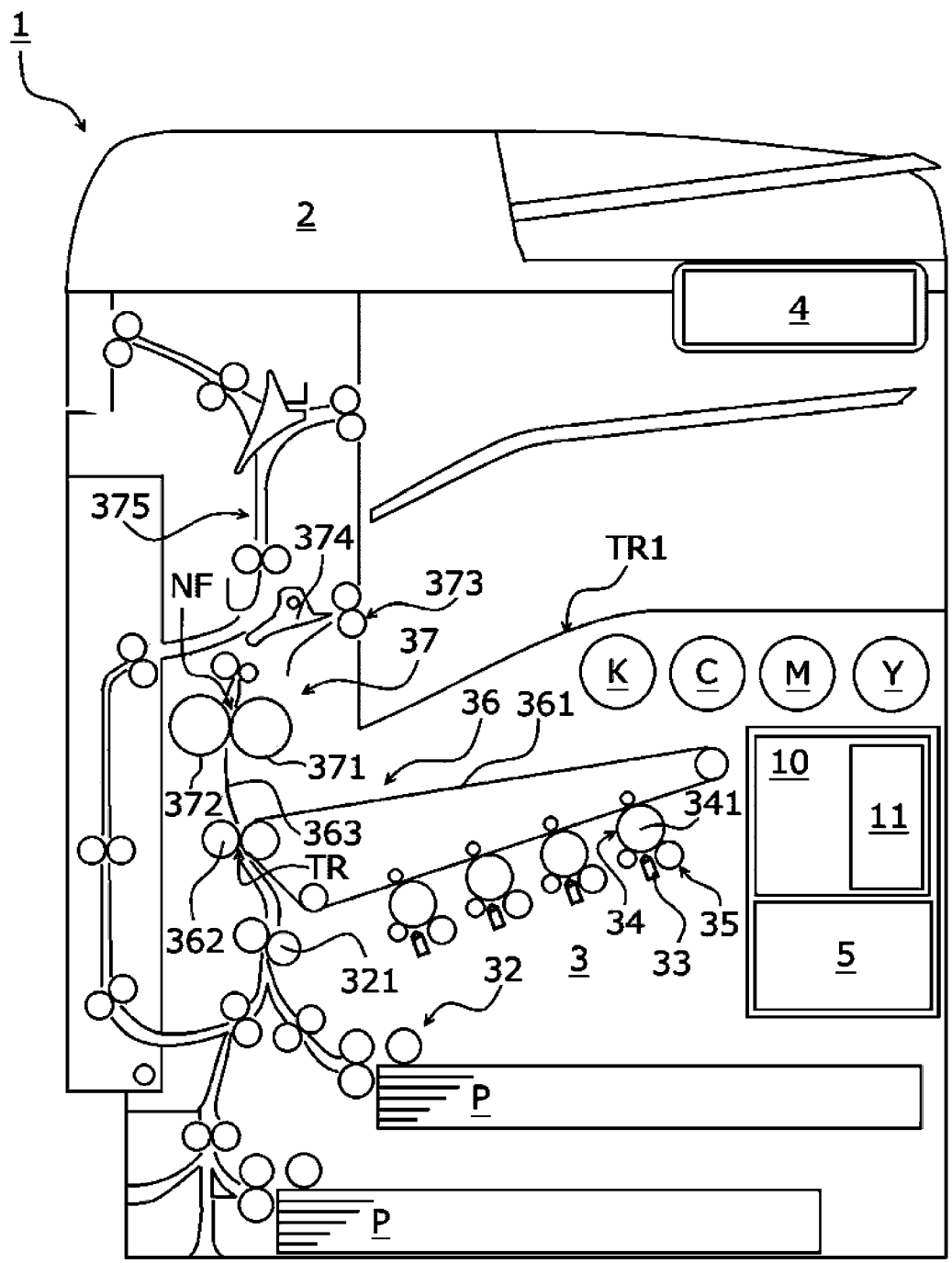
FIG. 1 is a schematic sectional view illustrating the internal structure of an image forming apparatus.

The present disclosure will be described in further detail by way of an exemplary embodiment and examples with reference to the drawings. However, the present disclosure is not limited to the exemplary embodiment and examples.

It is to be noted that the drawings referred to in the following description are schematic, and that dimensional ratios, for example, in the drawings differ from the actual dimensional ratios. Components other than those necessary to be described to facilitate understanding are omitted as appropriate in the drawings.

(1) Overall Structure and Operation of Image Forming Apparatus

Figure 2:
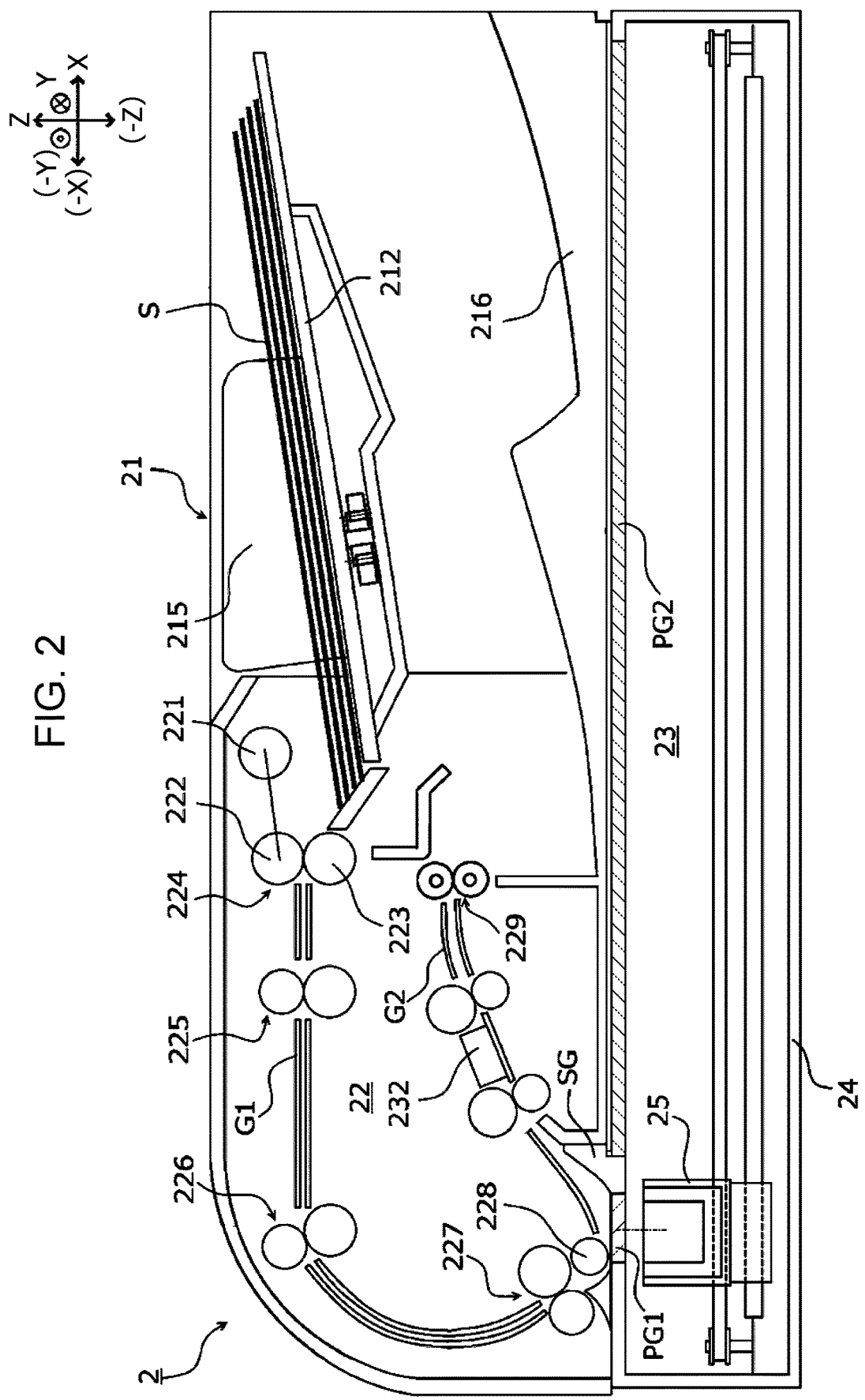
FIG. 2 is a sectional view illustrating the internal structure of an image reading device.
Figure 3:
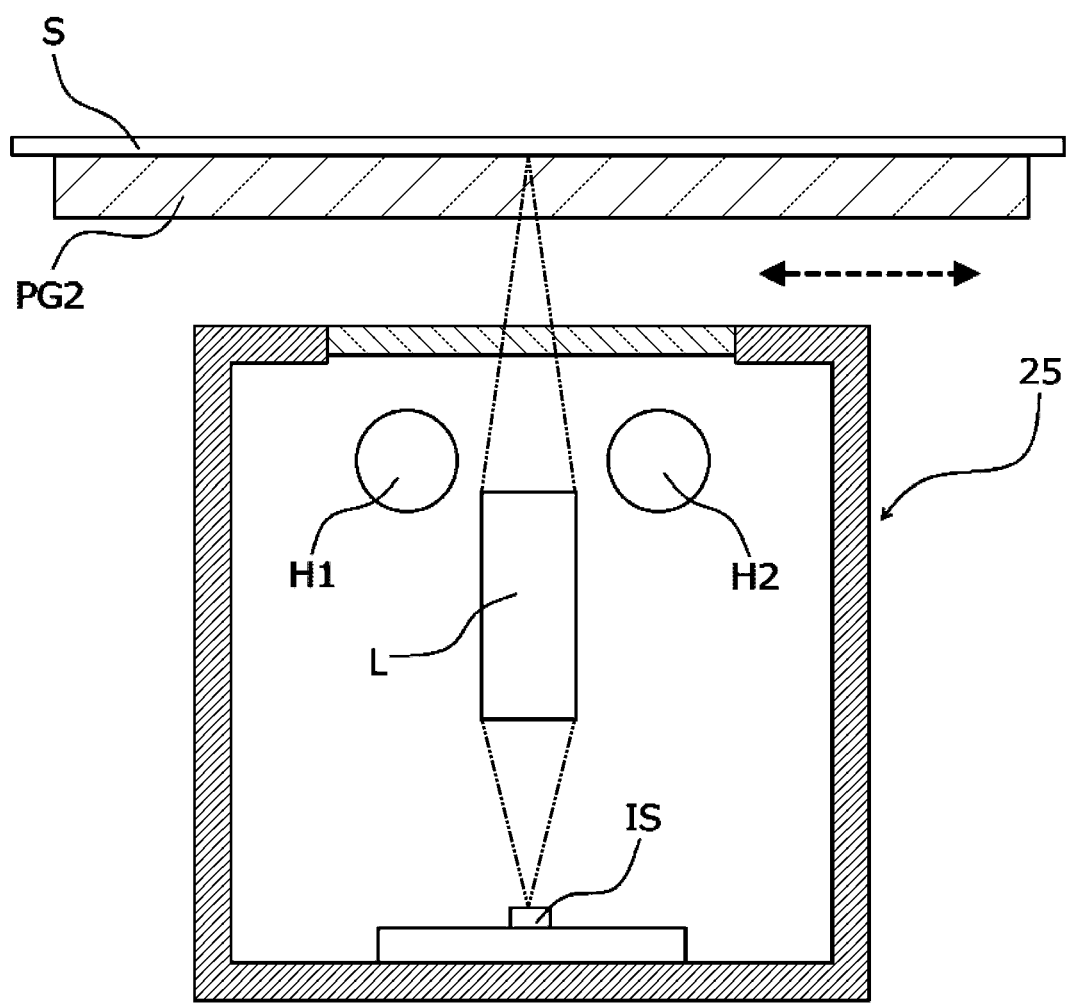
FIG. 3 is a schematic sectional view of an image reading section included in the image reading device.

FIG. 1 is a schematic sectional view illustrating the internal structure of an image forming apparatus 1 according to the present exemplary embodiment. FIG. 2 is a sectional view illustrating the internal structure of an image reading device 2. FIG. 3 is a schematic sectional view of an image reading section included in the image reading device 2. The overall structure and operation of the image forming apparatus 1 will be described with reference to the drawings.

(1.1) Overall Structure

The image forming apparatus 1 includes an image reading device 2 that reads an image on a sheet S, such as a document, and converts the image into image data; an image forming unit 3 serving as image recording means that prints an image on a paper sheet serving as a recording medium based on the obtained image data; an operation information unit 4 serving as a user interface; and an image processing unit 5.

The image reading device 2 includes a sheet stacking portion 21, an automatic sheet feeder 22, and an image reading section 23. The automatic sheet feeder 22 feeds sheets S placed on the sheet stacking portion 21 to a reading position of the image reading section 23. The image reading section 23 includes an image sensor IS, such as a charge coupled device (CCD) line sensor. An image read by the image sensor IS is converted into image data, which is an electric signal.

The image forming unit 3 includes a sheet feeding device 32, exposure devices 33, photoconductor units 34, developing devices 35, a transfer device 36, and a fixing device 37. The image forming unit 3 receives image information from the image processing unit 5 and forms a toner image on a paper sheet P fed from the sheet feeding device 32 based on the received image information.

The operation information unit 4 that serves as a user interface is disposed on the front surface of the image reading device 2. The operation information unit 4 includes a combination of, for example, a liquid crystal display panel, various types of operation buttons, and a touch panel. The user of the image forming apparatus 1 inputs various types of settings and instructions through the operation information unit 4. In addition, various types of information are presented to the user of the image forming apparatus 1 on the liquid crystal display panel.

The image processing unit 5 generates image data based on an image read by the image reading device 2 and print information transmitted from an external device (for example, a personal computer).

(1.2) Image Forming Unit

A paper sheet P designated for each sheet to be printed on in a print job is transported from the sheet feeding device 32 to the image forming unit 3 at a timing corresponding to an image forming operation.

The photoconductor units 34 are arranged next to each other above the sheet feeding device 32, and include photoconductor drums 341 that are rotated. The exposure devices 33 form electrostatic latent images on the respective photoconductor drums 341, and then the developing devices 35 form yellow (Y), magenta (M), cyan (C), and back (K) toner images on the respective photoconductor drums 341.

The toner images of the respective colors formed on the photoconductor drums 341 of the photoconductor units 34 are successively electrostatically transferred onto an intermediate transfer belt 361 included in the transfer device 36 (first transfer operation). Thus, a superimposed toner image obtained by superimposing the toners of the respective colors is formed. The superimposed toner image on the intermediate transfer belt 361 is transferred onto the paper sheet P by a second transfer roller 362, the paper sheet P being fed from a registration roller 321 and guided by a transport guide.

The fixing device 37 includes a heating module 371 and a pressing module 372 that form a fixing nip FN (fixing region) in a contact pressure region therebetween.

The paper sheet P to which the toner image has been transferred by the transfer device 36 is transported to the fixing nip NF of the fixing device 37 by a transport guide 363 while the toner image is not fixed thereto. The heating module 371 and the pressing module 372 apply heat and pressure to the toner image so that the toner image is fixed.

The paper sheet P on which the fixed toner image is formed is guided by a switching gate 374, and is discharged from a first discharge roller pair 373 and received by a paper output tray unit TR1 in an upper section of the image forming apparatus 1. The paper sheet P may instead be transported in a reverse direction for double-sided printing or be discharged with the image-recorded side facing upward. In such a case, the transporting direction is changed to a direction toward a transport path 375 by the switching gate 374.

(1.3) Image Reading Device

The sheet stacking portion 21 includes a sheet tray 212 that receives the sheets S on which images are recorded.

The automatic sheet feeder 22 includes a nudger roller 221 that successively advances the sheets S on the sheet tray 212 from the top sheet S and a separating unit 224 including a feed roller 222 and a retard roller 223.

The feed roller 222 and the retard roller 223 of the separating unit 224 form a pair of rollers that separate the sheets S from each other when the sheets S are fed to a nip portion N in a stacked state and transport the sheets S to the image reading section 23 one at a time.

A sheet transport path G1 has a take away roller 225 disposed downstream of the feed roller 222 in the transporting direction in which each sheet S is transported. The take away roller 225 transports the sheet S fed by the feed roller 222 to a pre-registration roller 226.

A registration roller 227 that adjusts the timing at which the sheet S is transported is disposed downstream of the pre-registration roller 226. The pre-registration roller 226 corrects skewing of the sheet S by forming a loop while the leading end of the sheet S is in contact with the registration roller 227 that is stationary. The registration roller 227 is rotated at a timing corresponding to the timing at which reading is started. The sheet S is pressed against a reading glass PG1 by a platen roller 228 while being looped by the take away roller 225 and the pre-registration roller 226, and the front side thereof is read by the image reading section 23.

The sheet S that has passed the reading glass PG1 is guided by a sheet guide SG and transported to a reading sensor 232. After the front side of the sheet S is read by the image reading section 23, the sheet S is transported along a sheet transport path G2 while the back side thereof is read by the reading sensor 232. Then, the sheet S is discharged to a paper output tray 216 below the sheet stacking portion 21 by a discharge roller 229.

The image reading section 23 includes a platen glass PG2 that is disposed on a top surface of a housing 24 and on which the sheet S is placed, and a carriage 25 that is disposed in the housing 24 and that is capable of reciprocating in a sub-scanning direction (left-right direction: X direction).

The carriage 25 carries a first lamp H1 and a second lamp H2 that are each composed of a light emitting diode (LED)

that illuminates the sheet S on the platen glass PG2, an imaging lens L that focuses light reflected by the sheet S at a predetermined magnification, and an image sensor (solid-state image sensor including CMOS) IS. The image sensor IS serves as a read sensor for reading an image on the sheet S, and generates an analog image signal that corresponds to the light reflected by the sheet S.

When the sheet S is placed on the platen glass PG2, image information is read for each line while the carriage 25 is moved in the sub-scanning direction (X direction). Thus, the image on the entire area of the sheet S is read by guiding the light reflected by the sheet S to the image sensor IS.

(2) Relevant Structure and Operation of Image Reading Device

Figure 4:
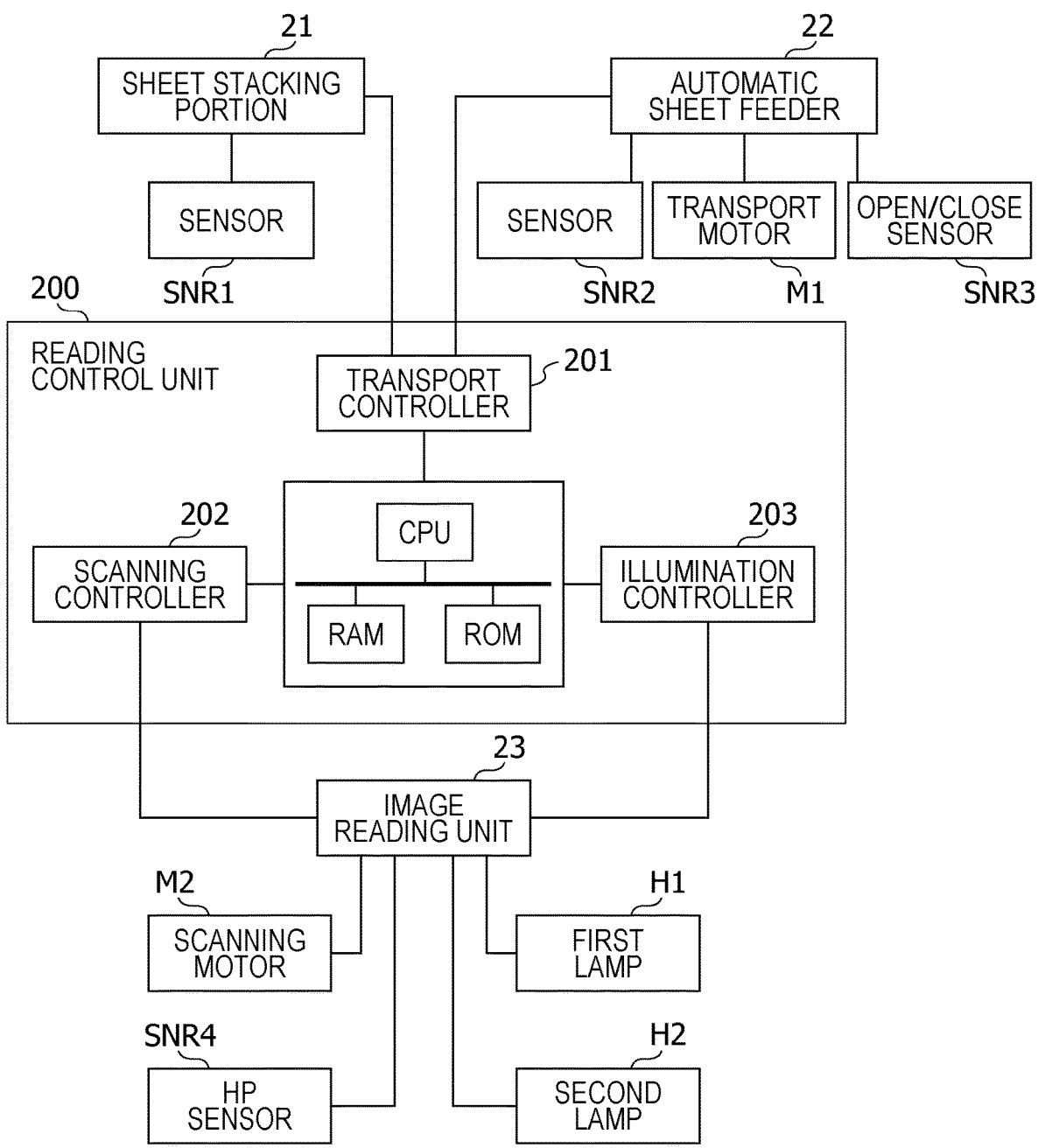
FIG. 4 is a functional block diagram of a reading control unit included in the image reading device.
Figure 5:
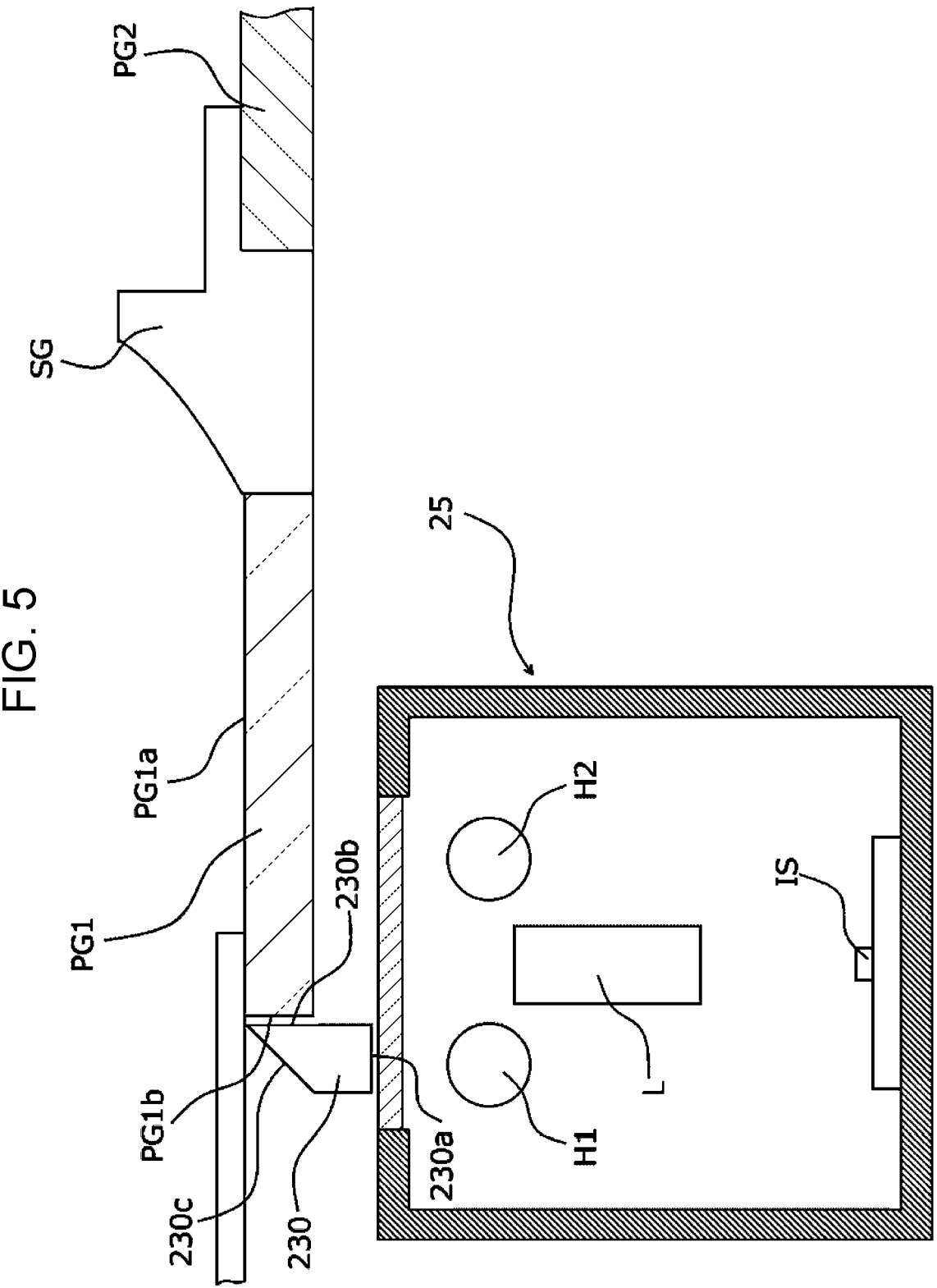
FIG. 5 is a schematic sectional view illustrating a region around the image reading section when a carriage is at a position for a foreign matter recognition mode.
Figure 6:
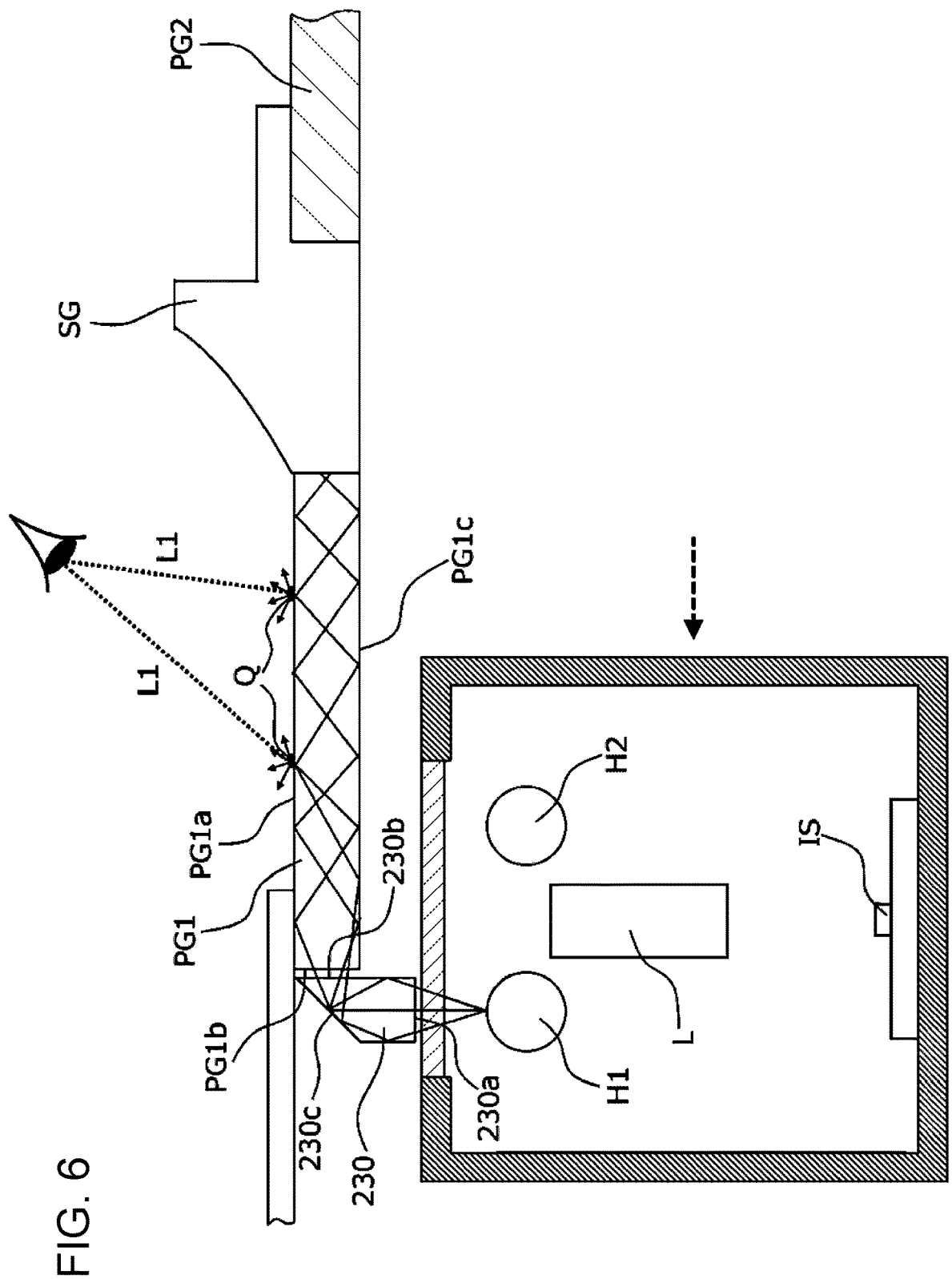
FIG. 6 is a schematic sectional view illustrating the manner in which foreign matter is recognized when the carriage is at the position for the foreign matter recognition mode.
Figure 7:
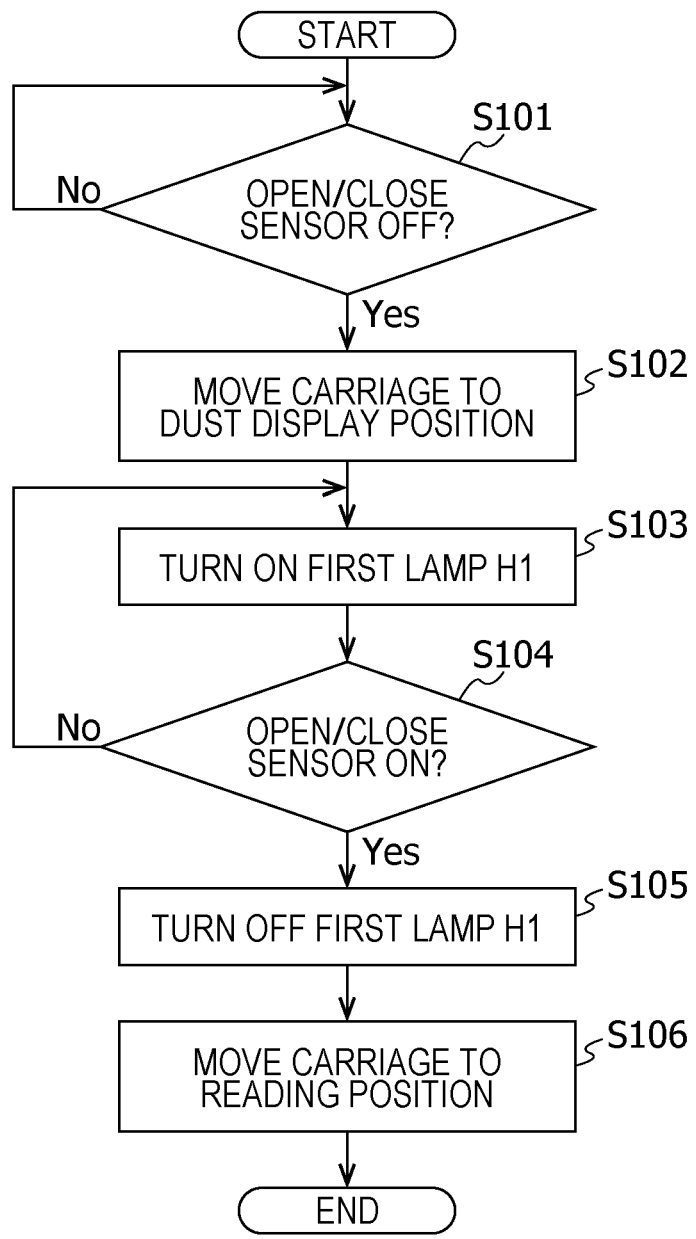
FIG. 7 is a flowchart of the operation in the foreign matter recognition mode.
Figure 11:
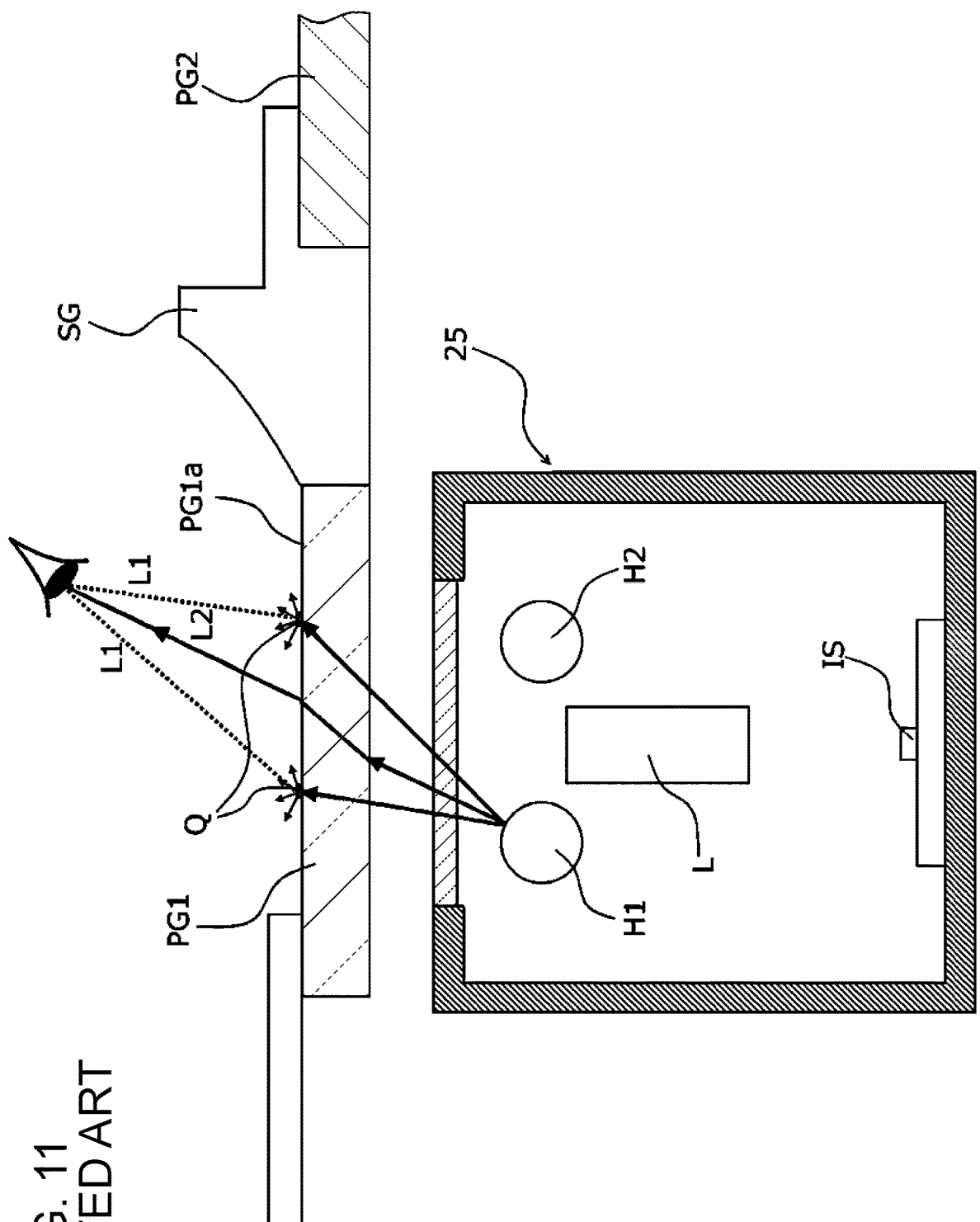
FIG. 11 is a schematic sectional view illustrating the manner in which foreign matter is recognized in an image reading device according to a comparative example.

FIG. 4 is a functional block diagram of a reading control unit included in the image reading device 2. FIG. 5 is a schematic sectional view illustrating a region around the image reading section when the carriage 25 is at a position for a foreign matter recognition mode. FIG. 6 is a schematic sectional view illustrating the manner in which foreign matter is recognized when the carriage 25 is at the position for the foreign matter recognition mode. FIG. 7 is a flowchart of the operation in the foreign matter recognition mode. FIG. 11 is a schematic sectional view illustrating the manner in which foreign matter is recognized in an image reading device according to a comparative example.

(2.1) Overall Structure of Reading Control Unit

As illustrated in FIG. 4, the image reading device 2 includes a reading control unit 200 that controls the operation of the sheet stacking portion 21, the automatic sheet feeder 22, and the image reading section 23.

A transport controller 201 receives detection information such as whether or not the sheets S are set and the size of the sheets S from a sensor SNR1 on the sheet stacking portion 21. In addition, the transport controller 201 controls the driving operation of a transport motor M1 of the automatic sheet feeder 22 and receives detection information from a sensor SNR2 that detects passage of a sheet along the sheet transport path G1 and detection information from an open/close sensor SNR3 that detects an open/closed state of the automatic sheet feeder 22.

A scanning controller 202 controls the driving operation of a scanning motor M2 for scanning in a region below the reading glass PG1 and the platen glass PG2, and receives detection information from a home position (HP) sensor SNR4 that detects a document reading position at which one side (front side) of the sheet transported along the reading glass PG1 is read.

An illumination controller 203 controls the illumination operation of light emitting elements of the first lamp H1 and the second lamp H2 based on driving current signals thereof.

(2.2) Foreign Matter Recognition Mode

The image reading device 2 is configured such that one side (front side) of the sheet S is read by the image reading section 23 while the sheet S is pressed against the reading glass PG1 by the platen roller 228. When foreign matter Q, such as dust or dirt, is present on a document reading surface PG1a of the reading glass PG1, the foreign matter Q is incorrectly regarded as a portion of a document image. The dust or dirt is, for example, paper dust that falls from the sheet S when the sheet S is transported or correction fluid that is separated from the sheet S, and remains on or adheres to the reading glass PG1.

FIG. 11 illustrates the case of an image reading device according to a comparative example in which a light emitting portion emits light from below the document reading surface PG1a of the reading glass PG1 to illuminate the foreign matter, such as dust or dirt, so that the foreign matter is recognized.

As illustrated in FIG. 11, the foreign matter Q on the document reading surface PG1a is illuminated with light emitted by the first lamp H1 from below the reading glass PG1 while the carriage 25 is at the document reading position. In this case, although scattered light L1 that is scattered by the foreign matter is visible from above the reading glass PG1, direct light L2 emitted by the first lamp H1 is also visible. Compared to the direct light L2, the scattered light L1 that is scattered by the foreign matter Q has a lower intensity and is more difficult to visually recognize. Thus, the dirt is not easily viewable by the user. In addition, the user may be dazzled when the direct light is incident on the user's eyes.

The image reading device 2 according to the present exemplary embodiment operates in the foreign matter recognition mode. In this mode, to improve the visibility of the foreign matter Q, light is emitted so that the light enters the reading glass PG1 through a side surface PG1b that crosses the document reading surface PG1a. In this state, the foreign matter, such as dust or dirt, is visually recognized by the user.

In the foreign matter recognition mode, the reading glass PG1 is irradiated with light after the carriage 25 is moved to a position different from the document reading position in the sub-scanning direction. This will be described in more detail below. A light guiding member 230 causes the light emitted from the light source of the first lamp H1 to enter the reading glass PG1 in a direction that crosses the document reading surface PG1a.

FIG. 5 is a schematic sectional view illustrating a region around the image reading section 23 when the carriage 25 is at the position for the foreign matter recognition mode. The transporting direction in which the sheet S is transported in a document reading operation is rightward in FIG. 5 (X direction). The left side (−X direction side) in FIG. 5 is defined as an upstream side in the transporting direction of the sheet S. As illustrated in FIG. 5, the light guiding member 230 is prismatic, and is disposed above the first lamp H1 and upstream of the reading glass PG1 in a gap between the first lamp H1 and the reading glass PG1 when the carriage 25 is at a dust display position.

The light guiding member 230 is a light guide that causes light incident on a first surface 230a to propagate therethrough so that the light is emitted from a second surface 230b that crosses the first surface 230a, and is made of a light transmitting resin, such as acrylic resin, PET resin, or PC resin, or a glass material.

As illustrated in FIG. 6, among the first lamp H1 and the second lamp H2 that are respectively disposed upstream and downstream of the image sensor IS in the sub-scanning direction, the first lamp H1 disposed on the upstream side emits light so that the light is incident on the first surface 230a of the light guiding member 230. The light incident on the first surface 230a propagates through the light guiding member 230, is reflected by a prism surface 230c, and is emitted from the second surface 230b toward the side surface PG1b of the reading glass PG1.

The light emitted from the second surface 230b of the light guiding member 230 enters the reading glass PG1 through the side surface PG1b of the reading glass PG1 and propagates through the reading glass PG1. The light propagates through the reading glass PG1 while being reflected by the document reading surface PG1a and a bottom surface PG1c. When the foreign matter Q is present on the document reading surface PG1a of the reading glass PG1, the light is scattered by the foreign matter Q and is visually recognized as scattered light L1 at a position above the reading glass PG1.

Direct light L2, which is part of the light emitted by the first lamp H1 that is not scattered by the foreign matter Q, remains in the reading glass PG1 and is not emitted outward. The second lamp H2 on the downstream side is turned off. Accordingly, the user views only the scattered light L1 scattered by the foreign matter Q.

Thus, the foreign matter, such as dust or dirt, on the reading glass PG1 is easily visually recognizable by the user.

The operation in the foreign matter recognition mode for causing the user to visually recognize the foreign matter Q on the document reading surface PG1a will now be described with reference to the flowchart illustrated in FIG. 7.

The reading control unit 200 determines whether or not the automatic sheet feeder 22 is open based on the detection result obtained by the open/close sensor SNR3 (see open/close sensor SNR3 in FIG. 4) of the automatic sheet feeder 22 (S101).

When the automatic sheet feeder 22 is open (S101: Yes), the scanning controller 202 proceeds to step S102 and controls the carriage 25 so that the carriage 25 is moved from the home position, which is the document reading position, to the position for the foreign matter recognition mode (S102). More specifically, the scanning controller 202 drives the scanning motor M2 with reference to the home position (HP) sensor SNR4 so that the carriage 25 is moved to the position for the foreign matter recognition mode, which is upstream of the document reading position.

Then, the illumination controller 203 turns on only the first lamp H1, which is disposed upstream of the image sensor IS in the sub-scanning direction (S103). Accordingly, light emitted from the first lamp H1 passes through the light guiding member 230, is emitted from the second surface 230b of the light guiding member 230, and is incident on the side surface PG1b of the reading glass PG1 to facilitate visual recognition of the foreign matter Q.

When the user visually recognizes the foreign matter Q, the user usually removes the foreign matter Q and then closes the automatic sheet feeder 22. Therefore, the scanning controller 202 determines whether or not the automatic sheet feeder 22 is closed based on the detection result obtained by the open/close sensor SNR3 (S104). When the automatic sheet feeder 22 is closed (S104: Yes), the illumination controller 203 turns off the first lamp H1 (S105) and the scanning controller 202 causes the carriage 25 to move to the home position (image reading position) (S106) and wait.

First Modification

Figure 8:
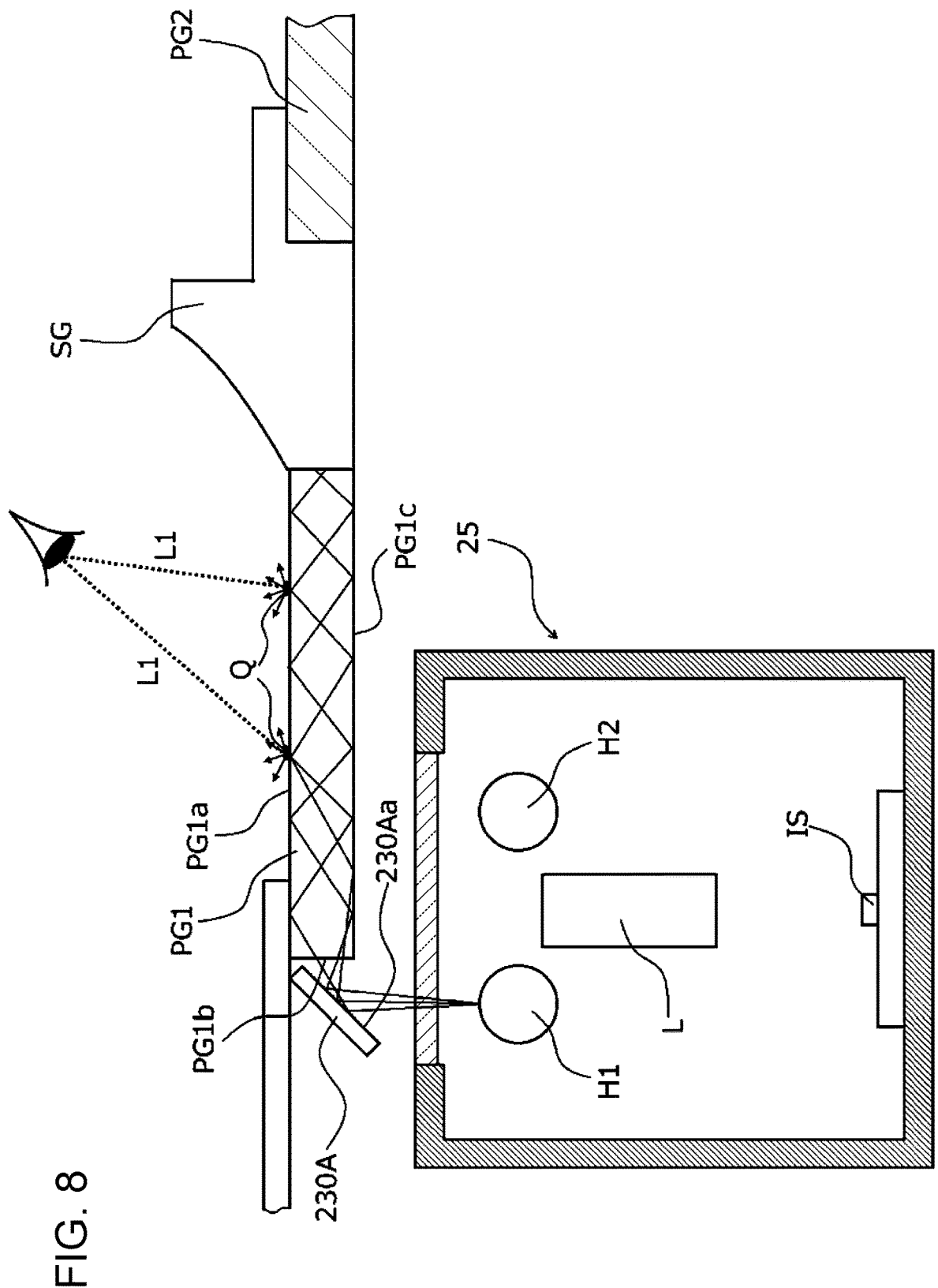
FIG. 8 is a schematic sectional view illustrating the foreign matter recognition mode of the image reading section including a light guiding member according to a first modification.

FIG. 8 is a schematic sectional view illustrating the foreign matter recognition mode of the image reading section 23 including a light guiding member according to a first modification. As illustrated in FIG. 8, a reflective plate 230A serves as the light guiding member, and is disposed above the first lamp H1 and upstream of the reading glass PG1 in the gap between the first lamp H1 and the reading glass PG1 when the carriage 25 is at the position for the foreign matter recognition mode.

The reflective plate 230A may be a plate-shaped member capable of causing white diffuse reflection, a plate-shaped member made of a highly reflective material, such as a metal, or a plate-shaped member including a surface layer composed of a thin metal film made of a highly reflective material. Alternatively, the reflective plate 230A may be formed by applying a resin in which metal particles or white pigment is dispersed to a plate-shaped member or by attaching a film containing these materials to a plate-shaped member.

As illustrated in FIG. 8, the light emitted from the first lamp H1 disposed on the upstream side is reflected by a reflective surface 230Aa of the reflective plate 230A, enters the reading glass PG1 through the side surface PG1b of the reading glass PG1, and propagates through the reading glass PG1.

The light propagates through the reading glass PG1 while being reflected by the document reading surface PG1a and the bottom surface PG1c. When the foreign matter Q is present on the document reading surface PG1a of the reading glass PG1, the light is scattered by the foreign matter Q and is visually recognized as scattered light L1 at a position above the reading glass PG1.

The light guiding member may be a diffusion plate instead of the reflective plate 230A. The diffusion plate may be formed by, for example, attaching a resin film in which scattering particles are dispersed to a plate-shaped member or forming a fine lens structure on a surface of a plate-shaped member instead of using the scattering particles. There is no particular limitation regarding the scattering particles as long as the scattering particles are capable of scattering light, and the scattering particles may be either organic or inorganic particles.

Examples of the organic particles include resin particles made of, for example, acrylic resin, silicone resin, or styrene resin. Examples of the inorganic particles include ceramic particles made of, for example, silica or alumina and metal particles made of, for example, aluminum, copper, or iron.

Second Modification

Figure 9:
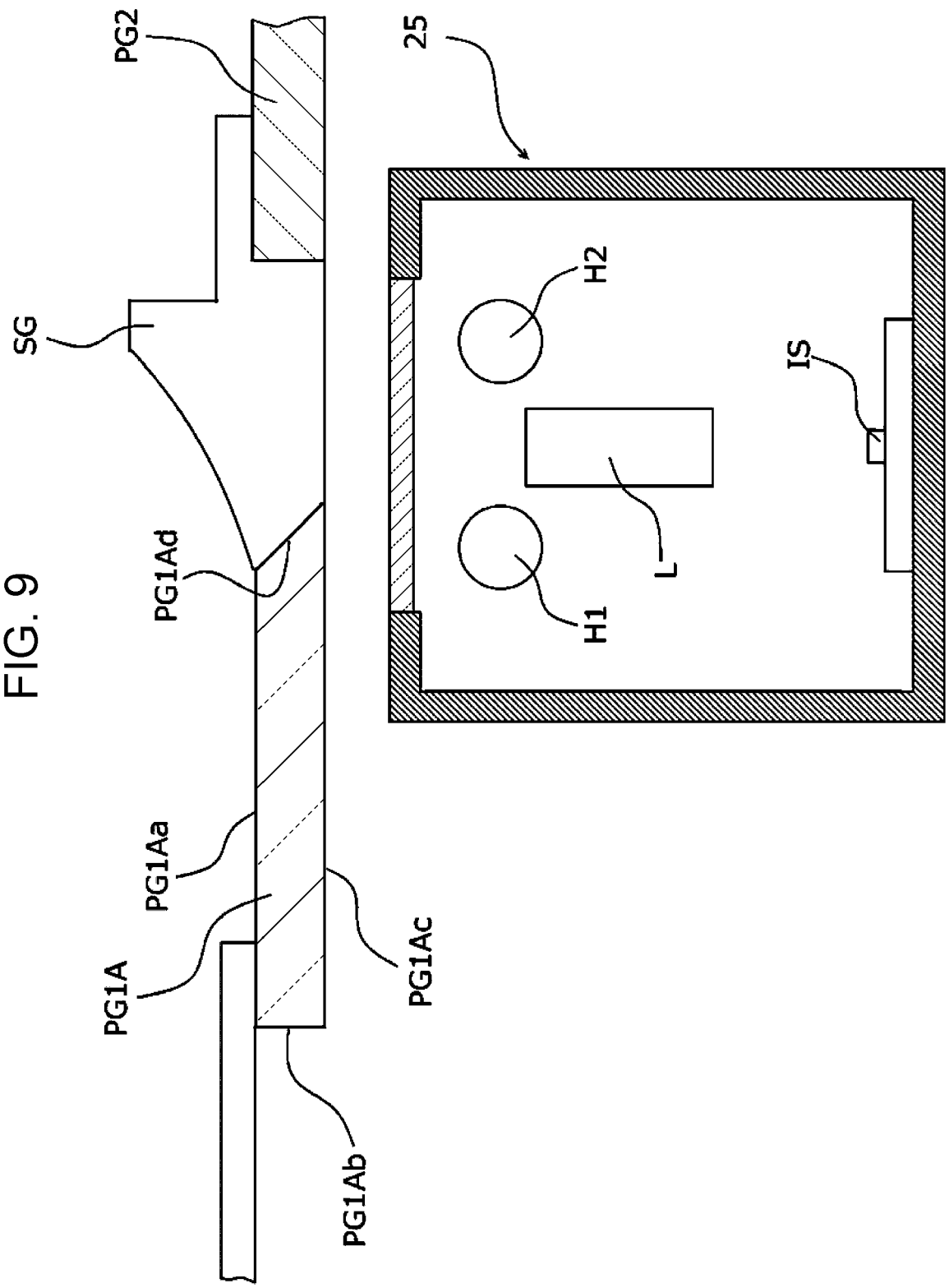
FIG. 9 is a schematic sectional view illustrating a region around the image reading section including a light guiding member according to a second modification.
Figure 10:
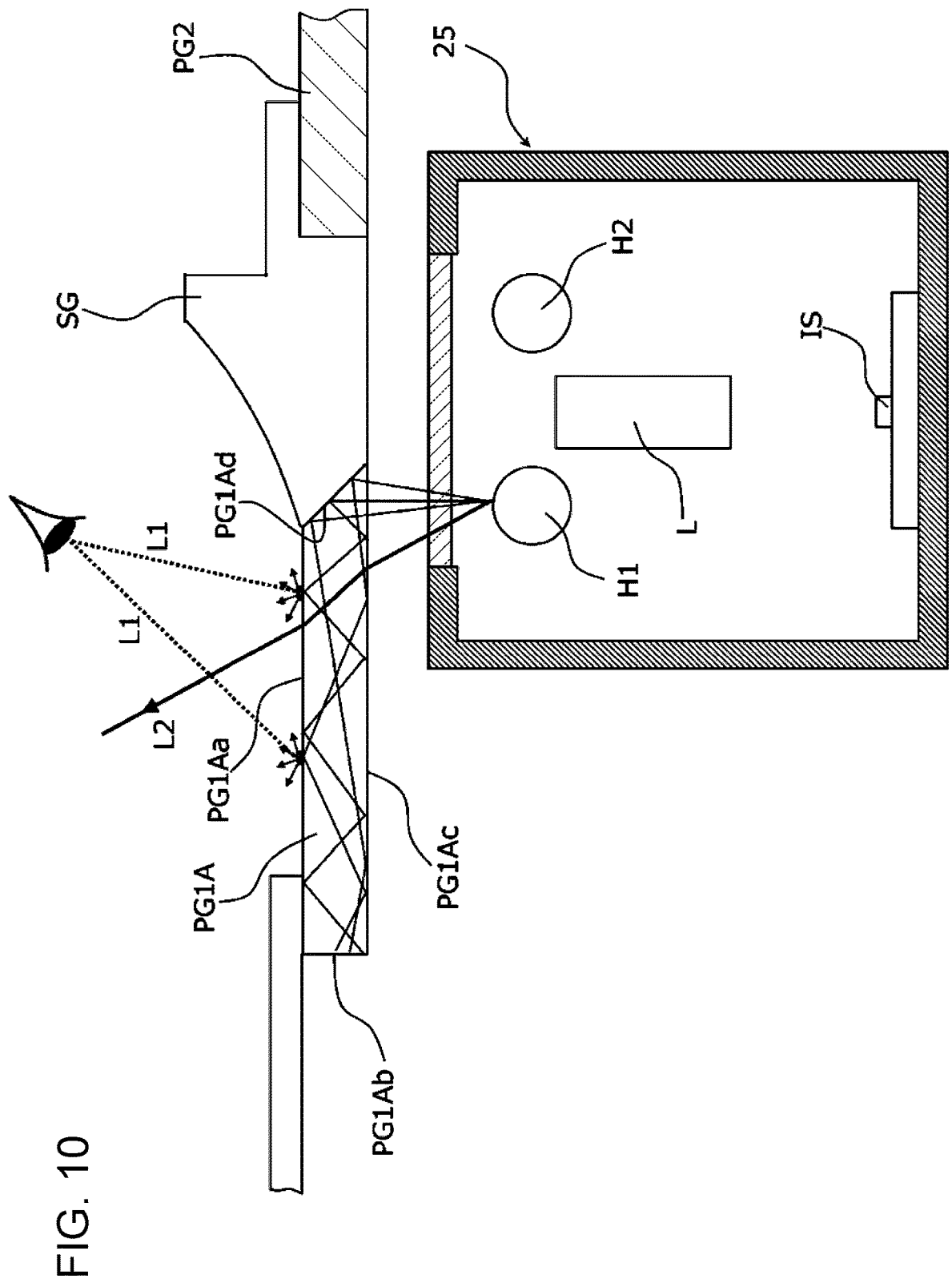
FIG. 10 is a schematic sectional view illustrating the foreign matter recognition mode of the image reading section including the light guiding member according to the second modification.

FIG. 9 is a schematic sectional view illustrating a region around the image reading section 23 including a light guiding member according to a second modification. FIG. 10 is a schematic sectional view illustrating the foreign matter recognition mode of the image reading section 23 including the light guiding member according to the second modification.

As illustrated in FIG. 9, the light guiding member is a side surface PG1Ad located downstream of a side surface PG1Ab that crosses a document reading surface PG1Aa of a reading glass PG1A in the moving direction of the sheet S. The side surface PG1Ad is inclined toward the upstream side. More specifically, among the side surfaces that cross the document reading surface PG1Aa of the reading glass PG1A, the downstream side surface PG1Ad is formed as an inclined surface inclined toward the upstream side in the moving direction of the sheet S. The side surface PG1Ad is disposed on a lower portion of the sheet guide SG that guides the sheet S that has passed the reading glass PG1 toward the reading sensor 232.

As described above, the downstream side surface PG1Ad of the reading glass PG1A is inclined toward the upstream side. The reading glass PG1A is irradiated with light after the carriage 25 is moved to a position different from and downstream of the document reading position in the sub-scanning direction. More specifically, as illustrated in FIG. 10, the carriage 25 is moved downstream in the sub-scanning direction so that the first lamp H1 is positioned below the downstream side surface PG1Ad of the reading glass PG1A, which serves as light guide means. Then, the first lamp H1 is caused to emit light.

When the second lamp H2 is turned off and the first lamp H1 emits light in the foreign matter recognition mode, as illustrated in FIG. 10, light emitted from the first lamp H1 on the downstream side is reflected by the downstream side surface PG1Ad of the reading glass PG1A and propagates through the reading glass PG1A.

The light propagates through the reading glass PG1A while being reflected by the document reading surface PG1Aa and a bottom surface PG1Ac. When the foreign matter Q is present on the document reading surface PG1Aa of the reading glass PG1A, the light is scattered by the foreign matter Q and is visually recognized as scattered light L1 at a position above the reading glass PG1A.

Direct light L2, which is part of the light emitted by the first lamp H1 that does not propagate through the reading glass PG1A, does not reach the user when the user is at a central position of the image reading device 2 in the left-right direction (sheet transporting direction). Light that is emitted toward a region downstream of the first lamp H1 is blocked by the sheet guide SG, which is located downstream of the reading glass PG1A. The second lamp H2 on the downstream side is turned off. Accordingly, the user views only the scattered light L1 scattered by the foreign matter Q.

Thus, dust or dirt on the reading glass PG1 is easily viewable by the user.

According to the present exemplary embodiment, the first lamp H1 and the second lamp H2 of the image reading section 23 are LEDs. However, the first lamp H1 and the second lamp H2 may be fluorescent tubes instead of LEDs. When the first lamp H1 and the second lamp H2 are LEDs that emit light in an accurately straight direction, the amount of light that is directly incident on the user's eyes is reduced since the light is emitted from a position different from the reading position in the foreign matter recognition mode.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading device comprising:
   a glass having a document reading surface along which a document moves;
   an image reading unit movable in a sub-scanning direction and including a light emitting portion that emits light to illuminate the document with the light and a light receiving portion that receives the light reflected by the document, the image reading unit reading the document that moves along the document reading surface at a predetermined document reading position; and
   a controller configured to cause the light emitting portion to emit the light so that the light enters the glass through a side surface that crosses the document reading surface in an operation different from an operation in which the image reading unit reads the document, wherein the controller is configured to cause the light emitting portion to emit the light while the image reading unit is at a position different from the document reading position in the sub-scanning direction.

2. The image reading device according to claim 1, wherein the controller is configured to cause the light emitting portion to emit the light at a position such that the light is guided through the side surface of the glass that crosses the document reading surface.

3. The image reading device according to claim 1, wherein the controller is configured to cause the light to be guided in a direction along the document reading surface.

4. The image reading device according to claim 1, wherein the controller is configured to cause the light to be guided at an incident angle less than an incident angle at which the light is incident on the glass when the image reading unit is at the document reading position.

5. An image forming apparatus comprising:
   the image reading device according to claim 1 that reads an image on a document; and
   an image recording unit that records the image read by the image reading device on a recording medium.

6. An image reading device comprising:
   a glass having a document reading surface along which a document moves;
   an image reading unit movable in a sub-scanning direction and including a light emitting portion that emits light to illuminate the document with the light and a light receiving portion that receives the light reflected by the document, the image reading unit reading the document that moves along the document reading surface at a predetermined document reading position;
   a controller configured to cause the light emitting portion to emit the light so that the light enters the glass through a side surface that crosses the document reading surface in an operation different from an operation in which the image reading unit reads the document; and
   a light guiding member that guides the light emitted from the light emitting portion so that the light is incident on the side surface of the glass that crosses the document reading surface.

7. The image reading device according to claim 6, wherein the light guiding member is provided on the side surface of the glass that crosses the document reading surface.

8. The image reading device according to claim 6, wherein the light guiding member is located upstream of the side surface of the glass that crosses the document reading surface in a direction in which the document moves.

9. The image reading device according to claim 6, wherein the light guiding member is a light guide that causes light incident on a first surface to propagate therethrough so that the light is emitted from a second surface that crosses the first surface.

10. The image reading device according to claim 6, wherein the light guiding member includes a reflective surface on which the light is incident and from which the light is emitted in a direction that crosses a direction in which the light is incident on the reflective surface.

11. The image reading device according to claim 6, wherein the light guiding member is a diffusion sheet on which the light is incident and from which the light is emitted in a direction that crosses a direction in which the light is incident on the diffusion sheet.

12. The image reading device according to claim 6, wherein the light guiding member is disposed downstream of the side surface of the glass that crosses the document reading surface in a direction in which the document moves.

13. The image reading device according to claim 6, wherein the light guiding member is disposed downstream of the glass in the direction in which the document moves and below a guide surface that guides the document.

14. The image reading device according to claim 12, wherein the side surface of the glass that crosses the document reading surface is inclined toward an upstream side in the direction in which the document moves.

15. The image reading device according to claim 13, wherein the side surface of the glass that crosses the document reading surface is inclined toward an upstream side in the direction in which the document moves.

16. The image reading device according to claim 6, wherein the light emitting portion includes two light emitting portions that are respectively disposed upstream and downstream of the light receiving portion in the sub-scanning direction, and one of the two light emitting portions that is close to the light guiding member emits the light.

* * * * *